(12) United States Patent
Wang et al.

(10) Patent No.: US 12,379,886 B1
(45) Date of Patent: Aug. 5, 2025

(54) SYSTEMS AND METHODS FOR DUPLICATING CONTENTS ON DISPLAY PANELS BASED ON AN ESTIMATED LIGHT INTENSITY

(71) Applicant: Toyota Motor North America, Inc., Plano, TX (US)

(72) Inventors: Timothy Wang, Ann Arbor, MI (US); Roger Akira Kyle, Aubrey, TX (US); Bryan Else Yamasaki, Aubrey, TX (US); Justin K. Shen, Canton, MI (US); Jackson Zhu, Ann Arbor, MI (US); Xiao Xu, Novi, MI (US); Michael R. Kushnerik, The Colony, TX (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/606,612

(22) Filed: Mar. 15, 2024

(51) Int. Cl.
| | | |
|---|---|---|
| *G06F 3/14* | (2006.01) | |
| *B60K 35/22* | (2024.01) | |
| *B60K 35/40* | (2024.01) | |
| *G01J 1/42* | (2006.01) | |

(52) U.S. Cl.
CPC ............ *G06F 3/1423* (2013.01); *B60K 35/22* (2024.01); *B60K 35/415* (2024.01); *G01J 1/4204* (2013.01); *G01J 2001/4266* (2013.01)

(58) Field of Classification Search
CPC ...................................................... G06F 3/1423
USPC .......................................................... 345/1.1
See application file for complete search history.

(56) References Cited

U.S. PATENT DOCUMENTS

| | | | |
|---|---|---|---|
| 8,816,833 | B2 | 8/2014 | Tominaga |
| 10,315,517 | B2 | 6/2019 | Segawa et al. |
| 10,528,216 | B2 | 1/2020 | Chen et al. |
| 2017/0166055 | A1 | 6/2017 | Maylone et al. |
| 2017/0313192 | A1* | 11/2017 | Segawa ................. B60K 35/60 |
| 2019/0114132 | A1* | 4/2019 | Chu ....................... G09G 5/006 |
| 2020/0262294 | A1 | 8/2020 | Gautier |

FOREIGN PATENT DOCUMENTS

KR 200415868 Y1 5/2006

* cited by examiner

*Primary Examiner* — Long D Pham
(74) *Attorney, Agent, or Firm* — Dinsmore & Shohl LLP

(57) ABSTRACT

A system for addressing a washout condition on a vehicle display includes an instrument cluster that makes up a first display panel, an infotainment cluster that makes up a second display panel positioned apart from the instrument cluster. The system also includes a conlight sensor to determine a sunlight condition, a navigation unit to determine navigational information pertaining to the vehicle, and an electronic control unit communicatively coupled to the first display panel, the second display panel, the conlight sensor, and the navigation unit. The electronic control unit determines an estimated light intensity on the first display panel based on the navigation information and the sunlight condition, and presents a prompt on the second display panel to duplicate contents displayed on the first display panel onto the second display panel when the estimated light intensity exceeds a reference light intensity value.

10 Claims, 2 Drawing Sheets

SYSTEMS AND METHODS FOR DUPLICATING CONTENTS ON DISPLAY PANELS BASED ON AN ESTIMATED LIGHT INTENSITY

TECHNICAL FIELD

The present disclosure relates to vehicle systems, and more particularly, to systems and methods for addressing potential meter washout on a vehicle's instrument cluster.

BACKGROUND

During the operation of a motor vehicle, an individual may reference data presented on instruments and displays contained within a vehicle's instrument cluster to obtain status information about their vehicle. The information may include the vehicle's speed, revolutions per minute (RPM), distance travelled, or other relevant status information pertaining to the vehicle's present or future condition. Typically, the instrument cluster is positioned in front of the driver, behind the steering wheel, on the vehicle's dashboard. The instruments and displays of the instrument cluster may be enclosed by one or more transparent panels, which may protect the instruments, but can also lead to the reflection of ambient light. Weather conditions, particularly sunny conditions, can lead to significant amounts of light entering a motor vehicle's passenger compartment and produce increased reflection off the one or more transparent panels, instruments, and/or displays, creating excess reflection (e.g., washout) that can obscure the readouts from the instrument cluster.

SUMMARY

In one aspect, a system for addressing a washout condition on a vehicle display includes an instrument cluster that makes up a first display panel, an infotainment cluster that makes up a second display panel positioned apart from the instrument cluster. The system also includes a conlight sensor to determine a sunlight condition, a navigation unit to determine navigational information pertaining to the vehicle, and an electronic control unit communicatively coupled to the first display panel, the second display panel, the conlight sensor, and the navigation unit. The electronic control unit determines an estimated light intensity on the first display panel based on the navigation information and the sunlight condition, and presents a prompt on the second display panel to duplicate contents displayed on the first display panel onto the second display panel when the estimated light intensity exceeds a reference light intensity value.

In another aspect, a method for preventing washout includes the following steps. The first step includes communicating a programmed route of a vehicle from a navigation unit to an electronic control unit. The second step includes determining an orientation of the vehicle along the programmed route and determining a sunlight condition along the programmed route. The third step includes estimating a light intensity on a first display panel based on the orientation of the vehicle and the sunlight condition, wherein the first display panel includes a plurality of instruments to communicate a status readout of the vehicle to a driver. The fourth step includes comparing the estimated light intensity along the programmed route to a reference light intensity value to determine if the estimated light intensity exceeds the reference light intensity value for greater than a threshold percentage of a total time of the programmed route. The fifth step includes duplicating the status readout from the plurality of instruments onto the second display if the estimated light intensity exceeds the reference light intensity value for greater than the threshold percentage.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a system and method for the duplication of a vehicle's status readout information from an instrument cluster onto an infotainment cluster when it is predicted that a vehicle's dashboard may be subjected to washout conditions. The disclosed system, discussed hereinafter, presents a method in which an individual can program a desired GPS route into a vehicle's navigation unit. The electronic control unit of the vehicle can incorporate data from the programmed route and then determine the vehicle's orientation and the relevant sunlight conditions along the programmed route. The electronic control unit is able to estimate the expected light intensity reflected off of the vehicle's instrument cluster based on the navigational data. The system can then compare the estimated light intensity along the programmed route to a threshold light intensity value to determine if the estimated light intensity exceeds the threshold light intensity value for a significant portion of the programmed route, thereby resulting in meter washout. In the event of predicted meter washout on the instrument cluster, the system can prompt the individual to duplicate the status readout from the plurality of instruments onto the vehicle's infotainment cluster to enable reliable access to status information pertaining to the vehicle so that, if washout conditions occur, the individual is still able to obtain information.

Figure 1:
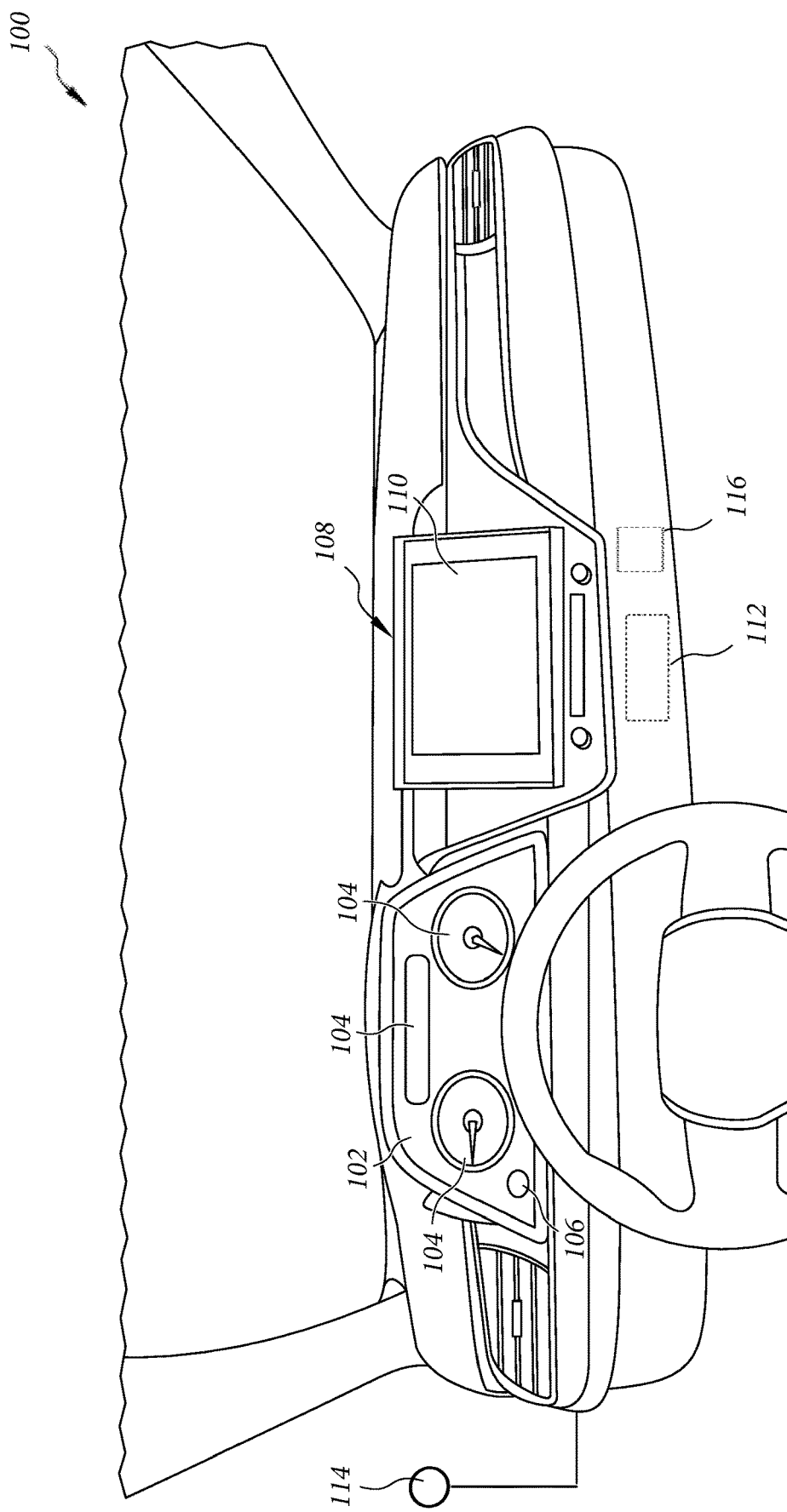
FIG. 1 graphically depicts an illustrative vehicle dashboard that includes a system for addressing meter washout, according to one or more embodiments shown and described herein.

Turning now to the figures, FIG. 1 schematically depicts a system 100 for preventing meter washout. The system 100 is positioned within a passenger compartment of a vehicle. The system 100 includes a cluster of instruments 104 that make up a first display panel 102. In embodiments, the first display panel 102 is positioned within a dashboard of the vehicle, behind the steering wheel such that the instruments 104 are visible to an individual (e.g., a driver of the vehicle. In some embodiments, the cluster of instruments 104 may include one or more gauges, such as, for example, a tachometer, a speedometer, one or more temperature gauges, a fuel gauge, or other similar gauges or the like capable of communicating information pertaining to the vehicle and/or a component thereof. Furthermore, the cluster of instruments 104 may also include supplementary screens or displays included within the first display panel 102 that provide additional readouts and graphical presentations to a driver regarding the status of the vehicle and/or components thereof. The readouts and graphical presentations may depict information pertaining to one or more vehicular systems or conditions of the vehicle. In embodiments, the first display panel 102 may include a single supplementary screen positioned between the tachometer and speedometer. In some embodiments, each instrument 104 of the cluster of instruments 104 may be communicatively coupled with an electronic control unit 112 of the vehicle to communicate a respective readout of each instrument 104 to the electronic control unit 112.

Additionally, the system 100 may also include an infotainment cluster 108 comprising a second display panel 110 positioned apart from the instruments 104. The infotainment cluster 108 may include a multimedia device featuring a plurality of telematics functions to allow a driver to access vehicle diagnostic information, driver-assistance features, and/or audio and video information, including entertainment, navigation, news, traffic, weather or the like. The infotainment cluster 108 may further include a navigation unit 116 to determine navigational information pertaining to the vehicle. The navigation unit 116 may include a GPS known to those of ordinary skill that is capable of determining a location, direction, orientation, or other similar navigational information pertaining to the position of the vehicle. Such information may be communicated to the instruments 104 to be relayed to an individual (e.g., the driver, a passenger). In embodiments, the second display panel 110 may be positioned proximate to the driver on the dashboard of the vehicle between, for example, the driver's seat and the passenger's seat. The first display panel 102 and the second display panel 110 may be positioned within the passenger compartment of the vehicle such that the first display panel 102 and the second display panel 110 are positioned apart from one another (e.g., separated) and are viewable from different angles so that each display panel 102, 110 does not experience the same incident angle of sunlight entering the vehicle. Furthermore, the infotainment cluster 108 may be communicatively coupled with an electronic control unit 112 of the vehicle to communicate information presented on the second display panel 110 to the electronic control unit 112 and to allow information generated by the electronic control unit 112 to be communicated to, and presented on the second display panel 110.

Additionally, the system 100 may include one or more external light sensors positioned about the vehicle to detect the sunlight condition on the exterior of the vehicle. In some embodiments, the one or more external light sensors may be referred to as conlight sensors 114. Each conlight sensor 114 may detect, amplify, and communicate an electric signal that is photoelectrically converted by a photodiode or a phototransistor to the electronic control unit 112 according to known methods. The conlight sensors 114 may, for example, be associated with functionality pertaining to headlights of the vehicle. Each conlight sensor 114 may detect the light conditions outside of the vehicle and communicate the measured light intensity values to the electronic control unit 112. Additionally, in some embodiments, this same functionality may be used to determine and predict a light intensity value inside of the vehicle's passenger compartment. In embodiments, the system 100 may include a plurality of conlight sensors 114 configured on the exterior of the vehicle. Each conlight sensor 114 may communicate its respective measured light intensity value to the electronic control unit 112, allowing the electronic control unit 112 to determine the intensity and direction of incoming sunlight and predict the amount of light exposure on the first display panel 102, according to known methods.

In some embodiments, the system 100 may also include on or more interior light sensors 106. The interior light sensors 106 may detect, amplify, and communicate an electric signal that is photoelectrically converted by a photodiode or a phototransistor to the electronic control unit 112 according methods known in the art. Each of the interior light sensors 106 may be positioned proximate the first display panel 102 to directly detect light within the passenger compartment of the vehicle. Specifically, the interior light sensors 106 may be positioned to detect light reflecting off of the first display panel 102 that may indicate washout affecting an individual's ability to read and comprehend the status readout information of the cluster of instruments 104. Each interior light sensor 106 may be communicatively coupled to the electronic control unit 112 for direct detection of light intensity on the first display panel 102. In embodiments, the system 100 may include a single interior light sensor 106 positioned behind the steering wheel and facing toward the first display panel 102 to directly detect reflected sunlight off the first display panel 102 and communicate the measured light intensity value to the electronic control unit 112. However, other locations of the interior light sensor 106 are contemplated and included in the scope of the present disclosure.

Still referring to FIG. 1, the system 100 may include an electronic control unit 112. In embodiments, the electronic control unit 112 may include multiple sub-components including one or more of a central processing unit (CPU), a random-access memory (RAM), a random-access memory (ROM), and a hard drive or other storage device. In embodiments, two or more electronic control unit 112 may be configured to operate in cooperation to carry out given processing functions within the vehicle. It should be understood that the electronic control unit 112 may be situated in any suitable location within vehicle to communicate (e.g., via wired or wireless communication) with various components of the vehicle, including the first display panel 102, the second display panel 110, the cluster of instruments 104, the infotainment cluster 108, one or more conlight sensors 114, one or more interior light sensors 106, and any other sensors, instruments, or devices required for the operation of the vehicle. In embodiments, the electronic control unit 112 may be equipped with an input-output interface, an ASIC (Application Specific Integrated Circuit), a nonvolatile memory, an onboard LAN device, or the like. Furthermore, the electronic control unit 112, along with other components in the infotainment cluster 108, may be capable of communicating with other sources inside of the vehicle or other external sources using wireless telecommunications equipment via cellular, satellite, Bluetooth or related compatible components.

In embodiments, the electronic control unit 112 may be communicatively coupled to the first display panel 102, the second display panel 110, the conlight sensor 114, and the navigation unit 116 via direct wiring. In additional embodiments, the electronic control unit 112 may be communicatively coupled to one or more interior light sensors 106. The electronic control unit 112 may receive measured light intensity values from one or both of the conlight sensor 114 and the interior light sensor 106. Additionally, the electronic control unit 112 may receive navigational information from the navigation unit 116, including GPS route information programmed by a user, vehicle location information, the vehicle's direction, or the vehicle's orientation/heading. In some embodiments, the electronic control unit 112 may further receive current and future weather information from an external source pertaining to the vehicle's current location or along the vehicle's programmed route. The electronic control unit 112 may accumulate the communicated information from the various components discussed herein and calculate an estimated light intensity on the first display panel 102 at least based on the navigation information and the sunlight condition. The electronic control unit 112 may contain a pre-programmed threshold reference light intensity value and may compare the estimated light intensity value against the programmed reference light intensity value. When the electronic control unit 112 determines that the estimated light intensity on the first display panel 102 exceeds the programmed reference light intensity value, the electronic control unit 112 may then generate and present a pop-up prompt on a screen of the infotainment cluster 108 contained on the second display panel 110. The prompt may suggest that the user duplicate the contents displayed on the first display panel 102 onto the second display panel 110 to provide an alternative method for viewing the readout information of the first display panel 102 and the plurality of instruments 104 on the second display panel 110.

In some embodiments, the electronic control unit 112 may analyze the navigation information provided by the navigation unit 116. The electronic control unit 112 may evaluate and estimate the location of the vehicle, an estimated orientation of the vehicle, and an estimated sun position along a user programmed GPS route to determine an estimated positional and temporal sun condition along the programmed route. The electronic control unit 112 may then estimate the light intensity on the first display panel 102 according to the calculated positional and temporal sun condition along the route, optionally factoring in additional direct light intensity measurements form the one or more conlight sensors 114 or interior light sensors 106. In embodiments, the electronic control unit 112 may contain a pre-programmed threshold reference light intensity value and a threshold route percentage, such that if the estimated light intensity exceeds the threshold reference light intensity value for greater than the threshold percentage of the route, the electronic control unit 112 recommends to the driver to duplicate the contents of the first display panel 102. When the estimated light intensity exceeds the reference light intensity value for greater than a threshold percentage of the programmed route, the electronic control unit 112 may then prompt the user via a pop-up prompt on a screen of the infotainment cluster 108 contained on the second display panel 110 to duplicate the contents displayed on the first display panel 102 onto the second display panel 110. It should be understood, that the threshold percentage refers to the amount of time at which the first display panel 102 is estimated or measured to have a light intensity above the programmed reference light intensity value compared to the total estimated duration of the programmed route. In embodiments, the threshold percentage of the programmed route may be greater than or equal to 10 percent, greater than or equal to 15 percent, greater than or equal to 20 percent, greater than or equal to 25 percent, greater than or equal to 30 percent, greater than or equal to 35 percent, greater than or equal to 40 percent, greater than or equal to 45 percent, or even greater than or equal to 50 percent of the duration of the programmed route.

In some embodiments, the electronic control unit 112 may incorporate direct light intensity measurements from the interior light sensor 106 and/or the external conlight sensor 114 to validate the estimated light intensity value along the programmed route. The electronic control unit 112 may contemporaneously compare the directly measured light intensity values versus the estimated light intensity values to validate and/or correct the estimated light intensity value.

In embodiments, the electronic control unit 112 may calculate the estimated light intensity on the first display panel 102 prior to the beginning of a route so that the user is not disturbed by a pop-up prompt on the second display panel 110 during operation of the vehicle. In other embodiments, the electronic control unit 112 may determine the estimated light intensity value on the first display panel 102 during the operation of the vehicle. In such embodiments, the electronic control until may present the driver with a prompt on the second display panel 110 to duplicate the contents of the first display panel 102 on to the second display panel 110 during the operation of the vehicle. Furthermore, in some embodiments, the electronic control unit 112 may receive and incorporate weather data and or traffic data from an external source via a wireless communication method. Contemporaneous weather and traffic data may allow the electronic control unit 112 to supplement the calculations of the estimated light intensity on the first display panel 102 along the programmed GPS route. For instance, in some embodiments, electronic control unit 112 may receive time-coded weather data along the duration of the programmed route. The electronic control unit 112 may incorporate this data to estimate a sunlight condition according to known and predicted weather conditions along the route. Furthermore, in some embodiments, the electronic control unit 112 may receive traffic information along the programmed route. The electronic control unit 112 may incorporate this data to update the duration of the total route and recalculate the duration of time in which the estimated light intensity on the first display panel 102 exceeds the programmed reference light intensity value.

Figure 2:
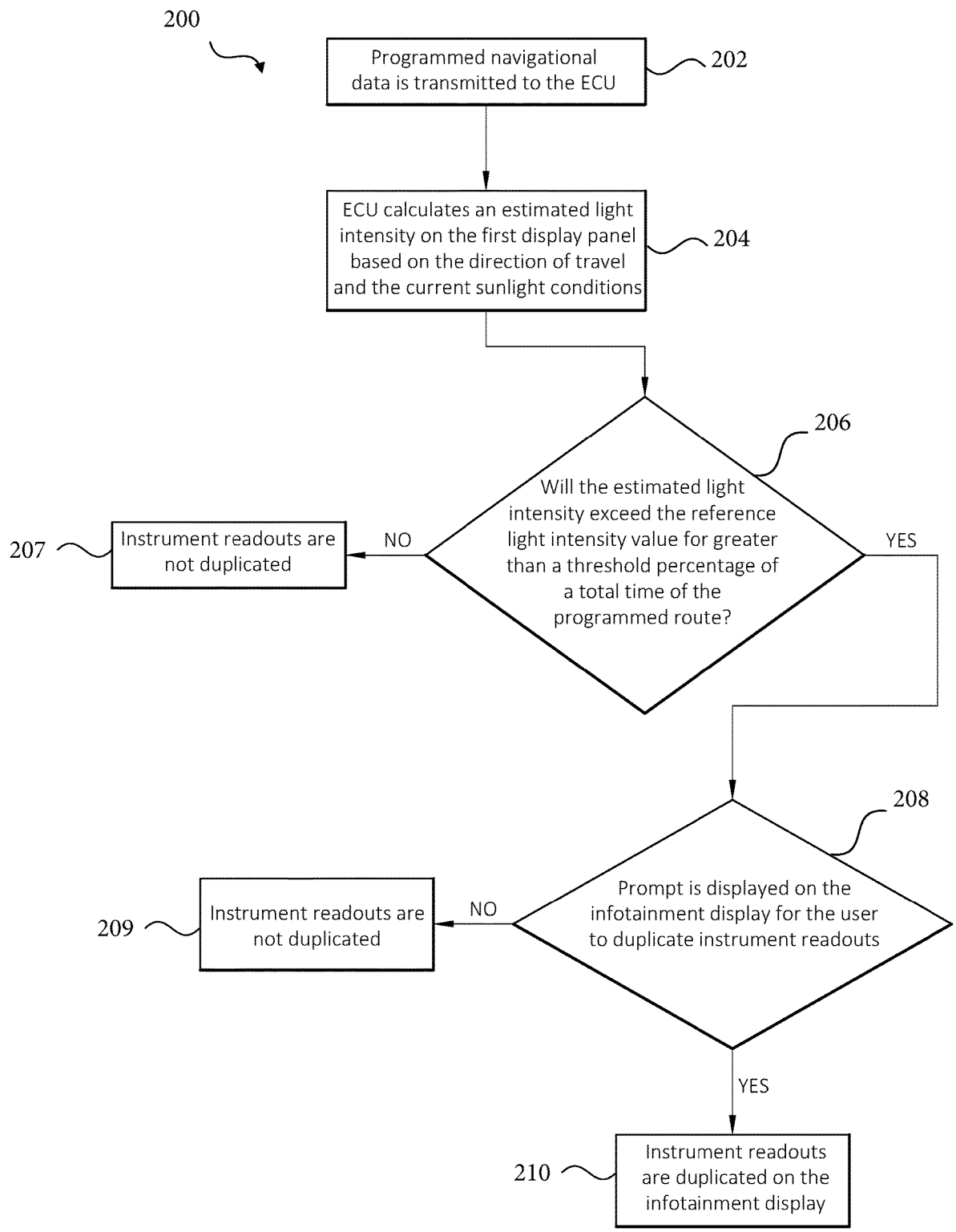
FIG. 2 depicts a block diagram demonstrating illustrative steps for addressing meter washout, according to one or more embodiments shown and described herein.

FIG. 2 depicts a flow diagram of an illustrative method 200 for addressing meter washout. At block 202, the method 200 includes a user communicating navigational information to the navigation unit 116 and the navigation unit 116 transmitting the programmed navigational data to the electronic control unit 112. For example, a user may directly program navigational data, such as a programmed route or destination, to the navigation unit 116 via a user interface on the infotainment cluster 108. The navigation unit 116 may then directly communicate the programmed route as well as current passive measurements made by the vehicle's navigation unit 116 to the electronic control unit 112 to allow the electronic control unit 112 to determine navigational information pertaining to the vehicle, including the vehicle's current orientation, the vehicle's expected orientation along the programmed route, the total duration of the programmed route, and the expected sunlight conditions along the programmed route relative to the vehicle. Furthermore, at block 204, the method 200 includes the electronic control unit 112 calculating an estimated light intensity on the first display panel 102. In embodiments, the electronic control unit 112 may receive and incorporate the navigation information determined in block 202 to estimate the expected light intensity on the first display panel 102 that may lead to washout of the cluster of instruments 104.

At block 206, the method 200 includes using the electronic control unit 112 to compare the estimated light intensity on the first display panel 102 along the programmed route to a programmed reference light intensity value to determine if the estimated light intensity exceed the reference light intensity value for greater than a threshold percentage of a total time of the programmed route. At block 207, if the estimated light intensity is not predicted to exceed the reference light intensity value for greater than a threshold percentage of the duration of the total programmed route, the readouts from the cluster of instruments 104 are not duplicated on the second display panel 110. However, as shown at block 208, if the estimated light intensity is predicted to exceed the reference light intensity value for greater than a threshold percentage of the duration of the total programmed route, the electronic control unit 112 prompts the user via the second display panel 110 to manually accept or decline to duplicate the status readout from the plurality of instruments 104 onto the second display panel 110 before beginning the programmed route. Furthermore, at block 209, the user may decline the prompt presented on the second display panel 110 so that the readouts from the cluster of instruments 104 is not duplicated on the second display panel 110. However, as shown at block 208, the user may accept the prompt (e.g., by actuating a button or the like) so the readouts from the cluster of instruments 104 is duplicated on the second display panel 110 to enable the user to view the readouts from the cluster of instruments 104 when there is a washout condition of the first display panel 102. In some embodiments, the electronic control unit 112 may automatically duplicate the status readout from the plurality of instruments 104 onto the second display panel 110 without prompting the user.

In some embodiments, the method 202 may include additional steps to validate the estimate light intensity values calculated by the electronic control unit 112. For instance, the electronic control unit 112 may incorporate direct light intensity measurements from the interior light sensor 106 and/or the external conlight sensor 114 to calculate and/or validate the estimated light intensity value along the programmed route. The electronic control unit 112 may contemporaneously compare the directly measured light intensity values versus the estimated light intensity values to validate and/or correct the estimated light intensity value. Furthermore, the method 200 may include an additional step wherein the electronic control unit 112 may receive and incorporate weather data and or traffic data from an external source via a wireless communication method. Incorporating contemporaneous weather and traffic data may allow the electronic control unit 112 to supplement the calculations of the estimated light intensity on the first display panel 102 along the programmed route. Furthermore, the electronic control unit 112 may incorporate traffic data along the programmed route to update the duration of the route and recalculate the duration of time in which the estimated light intensity on the first display panel 102 exceeds the programmed reference light intensity value.

In further embodiments, the method 200 may also include an additional step in which the electronic control unit 112 may detect a night time condition using the one or more conlight sensors 114. Furthermore, the method 200 may incorporate one or more interior light sensors 106 positioned proximate to the first display panel 102 to analyze the reflection of light emitted from the first display panel 102 on surrounding surfaces, like the driver's side window. Because excessive reflection from the first display panel 102 on the driver's side window can be distracting and potentially dangerous, the one or more interior light sensors 106 may determine if a light intensity reflected on the driver's side window exceeds a threshold light intensity valued programmed within the electronic control unit 112. If the driver's window light intensity exceeds the threshold driver's window light intensity value, the electronic control unit 112 may automatically dim the readouts of the first display panel 102 and prompt the user via the second display panel 110 to manually accept or decline duplicating the status readout from the plurality of instruments 104 onto the second display panel 110 to avoid additional light reflection on the driver's side window.

It should now be understood that the present disclosure relates to systems and methods for estimating a washout condition on an instrument cluster of a vehicle. The systems and methods of the present disclosure may estimate a washout condition on the instrument cluster of the vehicle by calculating an expected light intensity on the first display panel based on a programmed route, the expected orientation of the vehicle, and direct light intensity measurements from one or more light sensors. In addition, the system and methods of the present disclosure may address a washout condition by determining if the expected light intensity on the instrument cluster exceeds a reference light intensity value for greater than a threshold duration of the programmed route. If a washout condition is detected, the system may prompt a user to duplicate the readouts from the instrument cluster on to a second display panel to ensure continued access to the readouts on the second display panel during the washout condition.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for addressing a washout condition on a vehicle display, the system comprising:
   an instrument cluster comprising a first display panel;
   an infotainment cluster comprising a second display panel positioned apart from the instrument cluster;
   a conlight sensor to determine a sunlight condition; and
   a navigation circuit to determine a navigational information of the vehicle; and
   an electronic control circuit communicatively coupled to the first display panel, the second display panel, the conlight sensor, and the navigation circuit, the electronic control circuit determining an estimated light intensity on the first display panel based on the navigation information and the sunlight condition, and presenting a prompt on the second display panel to duplicate contents displayed on the first display panel onto the second display panel when the estimated light intensity exceeds a reference light intensity value.

2. The system for preventing washout of claim 1, wherein the electronic control circuit determines the estimated light intensity along a programmed route of the navigation information and duplicates the contents displayed on the first display panel onto the second display panel when the estimated light intensity exceeds the reference light intensity value for greater than a threshold percentage of the programmed route.

3. The system for preventing washout of claim 2, wherein the electronic control circuit receives and incorporates weather data and traffic data corresponding to the programmed route to determine the estimated light intensity.

4. The system for preventing washout of claim 1, further comprising an interior light sensor positioned proximate the first display and communicatively coupled to the electronic control circuit for direct detection of light intensity on the first display.

5. The system for preventing washout of claim 4, wherein the interior light sensor communicates a measured light intensity value to the electronic control circuit to validate the estimated light intensity.

6. A method for preventing washout comprising the steps of:
  communicating a programmed route of a vehicle from a navigation circuit to an electronic control circuit;
  determining an orientation of the vehicle along the programmed route and determining a sunlight condition along the programmed route;
  estimating a light intensity on a first display panel based on the orientation of the vehicle and the sunlight condition, wherein the first display panel comprises a plurality of instruments to communicate a status readout of the vehicle to a driver;
  comparing the estimated light intensity along the programmed route to a reference light intensity value to determine if the estimated light intensity exceeds the reference light intensity value for greater than a threshold percentage of a total time of the programmed route; and
  duplicating the status readout from the plurality of instruments onto a second display if the estimated light intensity exceeds the reference light intensity value for greater than the threshold percentage.

7. The method for preventing washout of claim 6, further comprising prompting a user on the second display to manually accept or decline duplicating the status readout from the plurality of instruments onto the second display before beginning the programmed route.

8. The method for preventing washout of claim 6, wherein the threshold percentage is 30 percent of the total time of the programmed route.

9. The method for preventing washout of claim 6, further comprising comparing the estimated light intensity to a measured light intensity communicated to the electronic control circuit by an interior light sensor positioned proximate the first display.

10. The method for preventing washout of claim 6, wherein the electronic control circuit receives and incorporates weather data and traffic data corresponding to the programmed route to determine the estimated light intensity.

* * * * *

UNITED STATES PATENT AND TRADEMARK OFFICE
CERTIFICATE OF CORRECTION

| | | |
|---|---|---|
| PATENT NO. | : 12,379,886 B1 | Page 1 of 1 |
| APPLICATION NO. | : 18/606612 | |
| DATED | : August 5, 2025 | |
| INVENTOR(S) | : Timothy Wang et al. | |

It is certified that error appears in the above-identified patent and that said Letters Patent is hereby corrected as shown below:

On the Title Page

Item [73], city, delete "Toyota (JP)" and insert --Toyota-shi Aichi-ken (JP)--, therefor.

In the Specification

In Column 2, Line(s) 58, after "vehicle", insert --)--.

In Column 4, Line(s) 4, delete "on" and insert --one--, therefor.

In Column 4, Line(s) 8, after "according", insert --to--.

In Column 4, Line(s) 31 & 32, delete "random-access memory (ROM)" and insert --read only memory (ROM)--, therefor.

In Column 5, Line(s) 34, delete "form" and insert --from--, therefor.

In Column 6, Line(s) 64, delete "exceed" and insert --exceeds--, therefor.

Signed and Sealed this
Sixteenth Day of September, 2025

Coke Morgan Stewart
*Acting Director of the United States Patent and Trademark Office*